US012045843B2

(12) United States Patent
Bonat et al.

(10) Patent No.: US 12,045,843 B2
(45) Date of Patent: Jul. 23, 2024

(54) SYSTEMS AND METHODS FOR TRACKING DATA SHARED WITH THIRD PARTIES USING ARTIFICIAL INTELLIGENCE-MACHINE LEARNING

(71) Applicant: JPMORGAN CHASE BANK, N.A., New York, NY (US)

(72) Inventors: Michelle Bonat, Half Moon Bay, CA (US); Tuan Dao, Richardson, TX (US); Rod Bachelor, San Carlos, CA (US); Jeremy F. Bennett, San Carlos, CA (US)

(73) Assignee: JPMORGAN CHASE BANK, N.A., New York, NY (US)

( * ) Notice: Subject to any disclaimer, the term of this patent is extended or adjusted under 35 U.S.C. 154(b) by 373 days.

(21) Appl. No.: 17/496,218

(22) Filed: Oct. 7, 2021

(65) Prior Publication Data
US 2022/0114603 A1    Apr. 14, 2022

Related U.S. Application Data

(60) Provisional application No. 63/089,751, filed on Oct. 9, 2020.

(51) Int. Cl.
G06Q 30/0201    (2023.01)
G06F 40/44      (2020.01)
G06N 3/042      (2023.01)

(52) U.S. Cl.
CPC ......... *G06Q 30/0201* (2013.01); *G06F 40/44* (2020.01); *G06N 3/042* (2023.01)

(58) Field of Classification Search
None
See application file for complete search history.

(56) References Cited

U.S. PATENT DOCUMENTS 10,824,949 B2 * 11/2020 Busbridge ........... G06F 16/9024
11,423,307 B2 *  8/2022 Shang ..................... G06N 3/088
(Continued)

OTHER PUBLICATIONS

Mehdy et al.; A User-Centric and Sentiment Aware Privacy-Disclosure Detection Framework based on Multi-input Neural Network; 13th ACM International WSDM Conference, 2020, in Houston, Texas, USA. (Year: 2020).*

(Continued)

*Primary Examiner* — Kambiz Zand
*Assistant Examiner* — Mahabub S Ahmed
(74) *Attorney, Agent, or Firm* — GREENBERG TRAURIG LLP (57) ABSTRACT

Systems, methods, and devices for tracking and managing data shared with third parties are disclosed. In one embodiment, a method including: retrieving data collection and usage policies of an entity; processing the data collection and usage policies with a natural language processing (NLP) model; generating, by the NLP model, predictive data collection and data usage attributes; generating a feature vector from the predictive data collection and data usage attributes; processing the feature vector with a graph neural network; storing data structured as a graph including the entity and the predictive data collection and data usage attributes; and processing the data structured as a graph with a classifier model that labels the entity as a first node in the data structured as a graph and predicts an edge to a second node in the data structured as a graph based on the predictive data collection and data usage attributes.

20 Claims, 2 Drawing Sheets

(56) References Cited

U.S. PATENT DOCUMENTS

| | | | | |
|---|---|---|---|---|
| 11,757,921 | B2* | 9/2023 | Grabois | G06F 21/552 726/25 |
| 2013/0275429 | A1* | 10/2013 | York | G06F 16/435 707/E17.002 |
| 2014/0279722 | A1* | 9/2014 | Singh | G06F 16/9535 706/11 |
| 2014/0279762 | A1* | 9/2014 | Xaypanya | H04L 63/145 706/12 |
| 2016/0078361 | A1* | 3/2016 | Brueckner | H04L 67/10 706/12 |
| 2016/0205122 | A1* | 7/2016 | Bassett | H04L 63/1441 726/23 |
| 2018/0247224 | A1* | 8/2018 | Garcia Duran | G06N 20/00 |
| 2018/0336183 | A1* | 11/2018 | Lee | G06N 5/022 |
| 2018/0336457 | A1* | 11/2018 | Pal | G06N 3/045 |
| 2020/0105255 | A1* | 4/2020 | Huang | G06F 16/3334 |
| 2020/0125083 | A1* | 4/2020 | Yu | G06F 18/24 |
| 2020/0225655 | A1* | 7/2020 | Cella | G05B 19/41875 |
| 2020/0250139 | A1* | 8/2020 | Muffat | G06V 30/1988 |
| 2020/0311559 | A1* | 10/2020 | Chattopadhyay | G06N 5/01 |
| 2020/0342523 | A1* | 10/2020 | Shah | G06F 16/9566 |
| 2020/0380171 | A1 | 12/2020 | Bonat et al. | |
| 2021/0019762 | A1* | 1/2021 | Bosnjakovic | G06F 16/9024 |
| 2021/0049441 | A1* | 2/2021 | Bronstein | G06F 16/9024 |
| 2021/0073291 | A1* | 3/2021 | Hunter | G06F 8/33 |
| 2021/0097502 | A1* | 4/2021 | Hilleli | G06N 3/08 |
| 2021/0133670 | A1* | 5/2021 | Cella | G06N 3/044 |
| 2021/0192358 | A1* | 6/2021 | Song | G06N 3/088 |
| 2021/0287459 | A1* | 9/2021 | Cella | G07C 5/0808 |
| 2021/0383205 | A1* | 12/2021 | Shang | G06N 3/088 |
| 2021/0409235 | A1* | 12/2021 | Cui | H04L 12/189 |
| 2022/0067439 | A1* | 3/2022 | Zhang | G06F 18/217 |
| 2022/0101103 | A1* | 3/2022 | Fatemi | G06N 3/088 |

OTHER PUBLICATIONS

Li et. al.; Combining Knowledge Graph Embedding and Network Embedding for Detecting Similar Mobile Applications; Springer (Year: 2020).*

Dou et al.; Enhancing Graph Neural Network-based Fraud Detectors against Camouflaged Fraudsters; ACM (Year: 2020).*

Lai et el.; Policy-GNN: Aggregation Optimization for Graph Neural Networks; ACM (Year: 2020).*

He et al.; Stealing Links from Graph Neural Networks; arXiv (Year: 2020).*

International Search Report, dated Feb. 2, 2022, from corresponding International Application No. PCT/US2021/054269.

Written Opinion of the International Searching Authority, dated Feb. 2, 2022, from corresponding International Application No. PCT/US2021/054269.

Vasisht Duddu; et al. "Quantifying Privacy Leakage in Graph Embedding", arxiv.org, Cornell University Library, 201 Olin Library Cornell University Ithaca, NY 14853, Oct. 2, 2020, XP081776684, Abstract, Sections 1,3.1,4,4.1,4.2.

* cited by examiner

SYSTEMS AND METHODS FOR TRACKING DATA SHARED WITH THIRD PARTIES USING ARTIFICIAL INTELLIGENCE-MACHINE LEARNING

RELATED APPLICATIONS

This application claims priority to, and the benefit of, U.S. Provisional Patent Application Ser. No. 63/089,751, filed Oct. 9, 2020, the disclosure of which is hereby incorporated, by reference, in its entirety.

The following application is hereby incorporated, by reference, in its entirety: U.S. patent application Ser. No. 16/890,991.

BACKGROUND OF THE INVENTION

1. Field of the Invention

Embodiments disclosed herein are generally directed to systems and methods for tracking and managing data that is shared with third parties using artificial intelligence-machine learning.

2. Description of the Related Art

The data sharing economy is complex and opaque to consumers. A single interaction between an individual consumer of online services or content and a vendor of such services or content often results in a cascade of data sharing by the vendor. For instance, a vendor of online services or content may share the consumer's data with third parties unknown to the consumer. Such sharing may result in such unknown third parties possessing a copy of the consumer's personally identifiable information (PII) and/or behavioral data. Moreover, the initial vendor, or any unknown third parties may engage in reselling the consumer's personal data to further unknown parties without the consumer's explicit knowledge or consent, thereby expanding the cascading effect of the consumer's initial online interaction.

SUMMARY OF THE INVENTION

Systems, methods, and devices for tracking and managing data shared with third parties are disclosed. In one embodiment, in an information processing apparatus comprising at least one computer processor, a method for tracking and managing data shared with third parties may include: (1) receiving, from a customer, an identification of a first-level entity with which the customer may share information; (2) retrieving at least one data source including privacy policies, contracts, public news, human inputs, and direct examination of websites for the first-level entity; (3) processing the data sources including the privacy policy using NLP and other methods; (4) based on the processed data and the privacy policy, generating a data graph comprising a plurality of nodes and edges, each node identifying a third party with which processed privacy policy identifies the first-level entity as having an information sharing relationship with and each edge identifies a type of information; (5) predicting a flow of data in data graph using AI-ML discriminative models to predict the edge probabilities; (6) creating insights and recommendations based on the predicted flow of data using AI-ML; and (7) providing the insights and recommendations to the customer.

In some aspects, the techniques described herein relate to a computer implemented method including: retrieving data collection and usage policies of an entity; processing the data collection and usage policies with a natural language processing model; generating, by the natural language processing model, predictive data collection and data usage attributes; generating a feature vector from the predictive data collection and data usage attributes; processing the feature vector with a graph neural network; storing, as output of the graph neural network, data structured as a graph including the entity and the predictive data collection and data usage attributes; and processing the data structured as a graph with a classifier model, wherein the classifier model labels the entity as a first node in the data structured as a graph and predicts an edge to a second node in the data structured as a graph based on the predictive data collection and data usage attributes.

In some aspects, the techniques described herein relate to a method, wherein the graph neural network is a graph convolutional model.

In some aspects, the techniques described herein relate to a method, including: verifying the predictive data collection and data usage attributes using trackable data.

In some aspects, the techniques described herein relate to a method, including: iteratively tuning one of the natural language processing model, the graph neural network, and the classifier model with the verified predictive data collection and data usage attributes.

In some aspects, the techniques described herein relate to a method, including: presenting, to a consumer of online services offered by the entity, information related to the predictive data collection and data usage attributes.

In some aspects, the techniques described herein relate to a method, wherein the information related to the predictive data collection and data usage attributes includes an indication that the entity shares personal data of the consumer with another entity.

In some aspects, the techniques described herein relate to a method, wherein the indication that the entity shares personal data of the consumer with another entity is based on the predicted edge to a second node in the data structured as a graph.

In some aspects, the techniques described herein relate to a method, including: tuning the graph neural network including adjusting a number of layers of the graph neural network.

In some aspects, the techniques described herein relate to a method including: tuning the classifier model including fitting a different model to the data structured as a graph at the classifier model.

In some aspects, the techniques described herein relate to a method, including: Resolving ambiguous nodes in the data structured as a graph.

In some aspects, the techniques described herein relate to a method, including: generating a feature vector from data representing the entity; associating the feature vector generated from the predictive data collection and data usage attributes with the feature vector from the data representing the entity; and processing the associated feature vectors with the graph neural network.

In some aspects, the techniques described herein relate to a system executing on one or more processors, wherein the one or more processors are configured to: retrieve data collection and usage policies of an entity; process the data collection and usage policies with a natural language processing model; generate, by the natural language processing model, predictive data collection and data usage attributes; generate a feature vector from the predictive data collection and data usage attributes; process the feature vector with a graph neural network; store, as output of the graph neural network, data structured as a graph including the entity and the predictive data collection and data usage attributes; and process the data structured as a graph with a classifier model, wherein the classifier model labels the entity as a first node in the data structured as a graph and predicts an edge to a second node in the data structured as a graph based on the predictive data collection and data usage attributes.

In some aspects, the techniques described herein relate to a system, wherein a graph neural network is a graph convolutional model.

In some aspects, the techniques described herein relate to a system, wherein one or more processors are configured to: verify the predictive data collection and data usage attributes using trackable data.

In some aspects, the techniques described herein relate to a system, wherein one or more processors are configured to: tune one of the natural language processing model, the graph neural network, and the classifier model with the verified predictive data collection and data usage attributes.

In some aspects, the techniques described herein relate to a system, wherein one or more processors are configured to: present, to a consumer of online services offered by the entity, information related to the predictive data collection and data usage attributes.

In some aspects, the techniques described herein relate to a system, wherein information related to the predictive data collection and data usage attributes includes an indication that the entity shares personal data of the consumer with another entity.

In some aspects, the techniques described herein relate to a system, wherein an indication that the entity shares personal data of the consumer with another entity is based on the predicted edge to a second node in the data structured as a graph.

In some aspects, the techniques described herein relate to a system, wherein one or more processors are configured to: tune the graph neural network including adjusting a number of layers of the graph neural network.

In some aspects, the techniques described herein relate to a system, wherein one or more processors are configured to: generate a feature vector from data representing the entity; associate the feature vector generated from the predictive data collection and data usage attributes with the feature vector from the data representing the entity; and process the associated feature vectors with the graph neural network.

BRIEF DESCRIPTION OF THE DRAWINGS

In order to facilitate a fuller understanding of the present invention, reference is now made to the attached drawings in which.

DETAILED DESCRIPTION OF PREFERRED EMBODIMENTS

Systems and methods for tracking and managing data shared with third parties are disclosed.

A graph data structure (also referred to herein as a "graph") is useful in representing many types of non-linear data, including certain networks or logical groupings of objects or entities and the relationships or interdependencies between them. A graph data structure may include two types of elements: nodes and edges. Nodes (also known as vertices) may represent an object or entity included in a graph. Edges may represent relationships or interdependencies between the nodes of a graph. In an exemplary graph data structure, nodes may be visualized as dots, circles, or some other shape, while edges are visualized as lines or arcs connecting the nodes to each other. Nodes may include additional data structures that describe the object or entity that the node represents. For example, if a node represents a person, the node may include data attributes such as "first name," "last name," "age," etc.

Graph Neural Networks (GNNs) are a class of deep learning methods designed to perform inference on data described by graphs. In accordance with an embodiment, inference may refer to the process of using a trained deep neural network model to make predictions on data that is previously unseen. For example, GNN methods may be applied to graphs in order to produce node-level, edge-level, and graph-level prediction tasks. Examples of learning models classified as GNNs include Graph Convolutional Networks (GCN), Graph Attention Networks (GAN), Gated Graph Neural Networks (GGNNs), Graph Long Short Term Memory Networks (Graph LSTM), Graph Learning Networks (GLN), Graph Machine Learning (GML), etc.

Data representing a group of entities with which a set of information has been shared may be organized as graph-structured data. For example, embodiments described herein may identify first-level entities that provide websites and/or online services (websites/services) with which a consumer interacts directly. For instance, a consumer may interact with a website/service provided by a first-level entity by providing personal or corporate-level information to the website/service. Embodiments may further identify or predict downstream (i.e., second, third, fourth . . . n, level) entities with which the consumer's information has been shared (e.g., entities with which the first-level entity has shared, or may share, the consumer's information with). These entities (regardless of level) may represent nodes in a graph. Embodiments may identify, determine or predict, as edges in a graph, relationships between such node-entities.

Embodiments may leverage numerous data sources for gathering data, such as privacy policies, contracts, public news, human inputs, direct examination of websites, etc., to build training sets and graphs of a data sharing network of entities. Graph nodes may represent legal entities (e.g., companies, organizations, etc.), and the edges may represent data sharing relationships. For example, edges may be as general as "sharing," or as specific as "sharing web browsing click trails."

A graph may be generated based on inputs that may include real-world relationships and data flows. The graph, itself, may be wholly or partly generated using artificial intelligence including, but not limited to, machine learning (also referred to collectively herein as AI-ML). For instance, GNN models may be employed to assist in creating data sharing graphs. More traditional methods, such as manually identifying first-level nodes, may also be employed. Combinations of AI-ML and traditional methods of building graph training sets and graphs and/or identifying graph nodes may also be employed.

Embodiments may include validation of generated graphs using probes including trackable data and interaction with entities represented as graph nodes. For example, once built, the graph may be validated and modified by inserting data probes comprising trackable data (e.g., synthetic data) with a specific entity/organization (e.g., a first-level entity represented on the graph) and monitoring the other entities represented as nodes in the graph for receipt of the probe data.

In another embodiment, real-world data (e.g., consumer data) may be tracked as it progresses through the machine learning processing. Based on the data's progress, the machine learning models may be fitted, verified, updated, etc., as is necessary and/or desired.

In an embodiment, each node in a data graph may be associated with a prediction metric that data submitted at a specific node will reach the node. This prediction metric may further be based on the timing of the submission, the nature of the submission, the usage requirements from third parties that may require certain, but not all, of the data, etc. For example, edges of the network may contain metadata about, or be created based on, the predictive likelihood that data may traverse that path and that nodes contain metadata about what data are desired, retained, and deleted. This metadata may be gleaned from the privacy policy of the company or other data sources.

The graph may then be traversed to determine likely sources of data, as well as organizations/entities to contact to remove that data.

Figure 1:
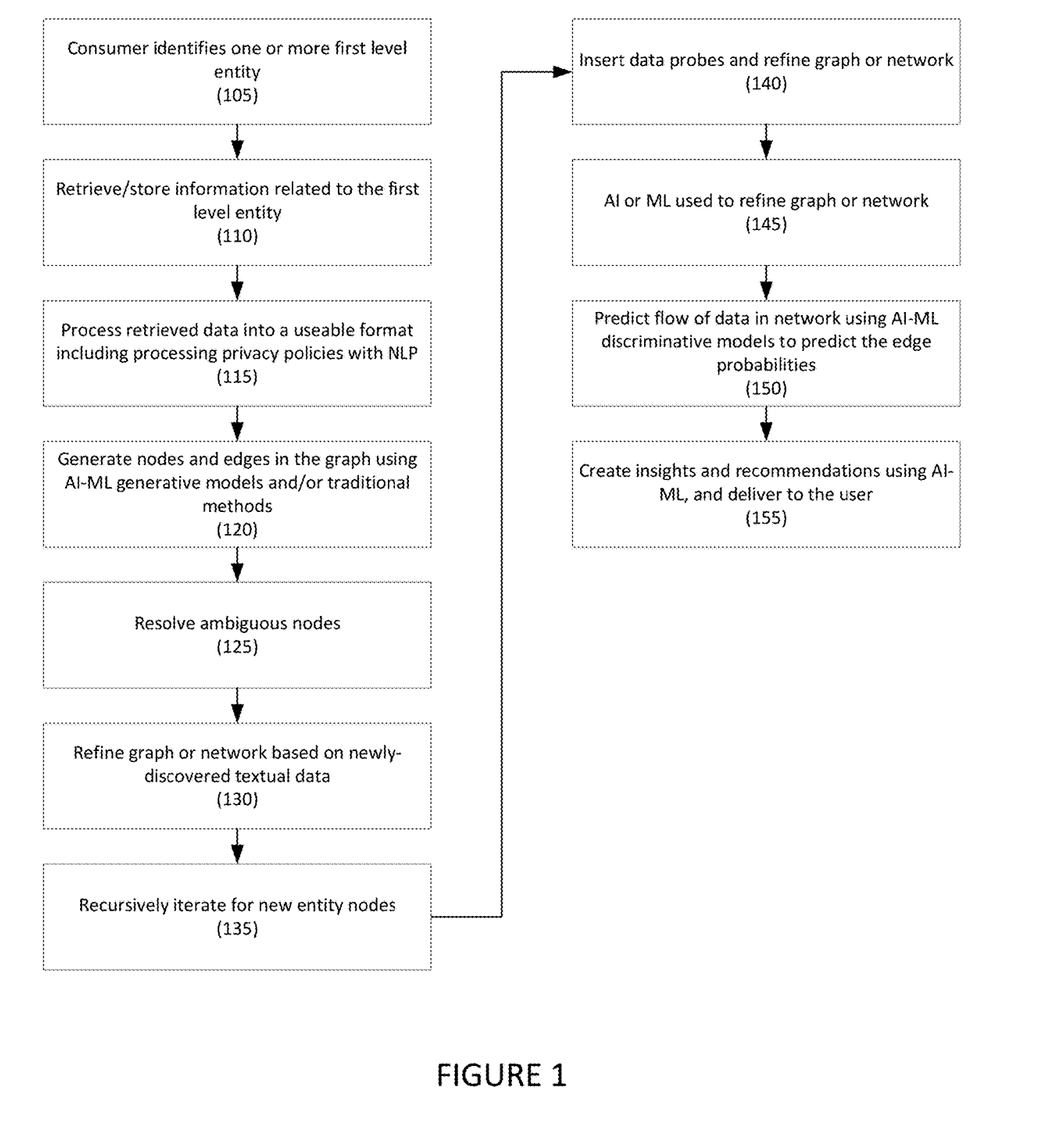
FIG. 1 discloses a method for building a data sharing graph or network, in accordance with an embodiment.

Referring to FIG. 1, a method for building a data sharing graph or network is disclosed according to an embodiment.

In step 105, entities that provide websites, online services and/or content to a consumer (e.g., an individual customer, an organization, etc.) may be identified as a first-level entity that collects data directly from the consumer. Examples of such first-level entities include online advertisers, social media network providers, website providers, app providers, etc.

An initial list of first-level entities may be created based on, for example, user browser history/logs, network monitoring of web traffic, explicit user input, monitoring application installations on user devices, etc. User devices, system logs, etc., may be scanned/parsed to identify potential sharing of data with first-level entities.

In another embodiment, this information may be obtained by a direct examination of websites. For example, the information may be collected by crawling a target website and collecting the names/URLs of all entities that may engage in collecting and tracking data usage associated with that site.

In step 110, information related to the first-level entity's collection and usage of consumers' data (including the first-level entity's privacy policies, and its consumer-data tracking activities and methods, such as: third party cookies, ad trackers, canvas/browser fingerprinting, and tracking by social networks and platforms (e.g., Facebook, Google Analytics, etc.) may be retrieved. Such information may be referred to collectively herein as a first-level entity's data collection and usage policies In an embodiment, each first-level entity may be associated with a privacy policy. Particularly regarding web sites/services (but not limited thereto), many entities publish terms and conditions, including a privacy policy. Such publication may be voluntary or mandated, depending on jurisdictional laws, norms, etc. Accordingly, the privacy policy of a first-level entity may be identified by automatically searching, parsing and/or traversing the first-level entity's website, by manual retrieval of the privacy policy from a website, etc.

In one embodiment, where multiple first level entities are using the same identifier, fingerprint, cookie, etc., it could be predicted that a shared second party will receive the data. For example, if it is learned that a tracking method is in place on a first-level entity's website that enables data to be tracked and shared by a social network and/or platform, understanding these data collection policies may, in turn, enable embodiments to infer that data sharing from the first-level entity to the social network/platform may occur.

In step 115, a first-level entity's data collection and usage policies are processed into a useable format. For instance, a first-level entity's data collection and usage policies may be formatted and transformed from an initial unstructured nature or form into a more structured nature or form. In embodiments, this may include processing, e.g., privacy policies with NLP (natural language processing). A privacy policy, or other textual data collection and usage policies, may be processed using NLP in order to identify specific word patterns that indicate that the entity collects, uses, shares, sells, etc., a consumer's data. For example, NLP may be used to discern types of consumer data collected, declared usage of consumer data, and/or sharing of collected consumer data, by the first-level entity. For instance, an entity may publish the following information regarding data that it collects from consumers of its website/service:

"Information You Provide To Us. At some Services, you can register, order products, enter contests, vote in polls or otherwise express an opinion, subscribe to one of our services such as our online newsletters or text message alerts, or participate in one of our online forums or communities. In the course of these various offerings, we often seek to collect from you various forms of information, such as: name, address, e-mail address, telephone number, fax number and credit card information."

This passage may be processed (e.g., by NLP, other forms of AI-ML, algorithmically, or manually) to learn that the entity may collect the following information from consumers of the site/service: Name, Address, E-mail address, Phone, Fax, Credit Card information.

Other passages from documents linked to, or published textual portions of, a website (such as, e.g., a "Data Usage" disclaimer) may be traversed, parsed, and/or processed as described above to identify how an entity uses the consumer data that it collects. For example, an entity may publish the following "data usage" information:

"customize or personalize ads, offers and content made available to you based on your visits to and/or usage of the Services or other online or mobile websites, applications, platforms or services, and analyze the performance of those ads, offers and content, as well as your interaction with them . . . "

This passage may be traversed, parsed, and/or processed as described above to learn that one declared use of the data is to serve ads that are generated based on personal data collected from the consumer's use of the website/service.

Other passages, such as "Data Sharing," may be traversed, parsed, and/or processed as described above to identify with whom the data may be shared. For example, an entity may include the following "data sharing" information:

"We may share the Information with unaffiliated Partners and third parties (e.g., our third-party service providers, advertisers, advertising networks and platforms, agencies, other marketers, magazine publishers, retailers, participatory databases, and non-profit organizations) that wish to market products or services to you."

This passage may be traversed, parsed, and/or processed as described above to determine that information is shared with Unaffiliated Partners, Third party service providers, Advertisers, Advertising networks, Marketers, etc.

Any other relevant provision in the data collection and usage policies may be reviewed, traversed, parsed, and/or processed as described above as is necessary and/or desired.

In addition, other documents related to, or containing information indicating a first-level entity's data collection and usage practices that may be available to the public (such as, e.g., contracts that the entity may have with a second or n-level entity regarding the sharing of data, and/or other intelligence to derive business and/or data sharing/selling relationships), may be reviewed and processed as described above to glean additional data collection and usage policies and information. This information may be reviewed to resolve ambiguities, to gather additional information, etc.

In step 120, nodes and edges in the graph may be generated using the information obtained from the data collection and usage policies, from the information from user interactions with apps and websites, and from other documents and data sources. The nodes and edges in the graph may be generated using AI-ML generative models or more traditional methods. These AI-ML approaches may include: Variational Autoencoder (VAE), auto-regressive models, and other approaches (including the GNN models discussed above), to generate graphs with a similar structure. In embodiments where traditional methods are used to generate all or a part of the graph, AI-ML may be used to predict nodes and edges based on incomplete data.

Although the generation of the graph to identify relationships, and the identification of what information may be shared are described as occurring concurrently, or substantially concurrently, it should be recognized that these processes may occur serially or separately. In addition, different data sources may be used.

Additionally, updates to the graph and/or the information shared may occur concurrently, or the updates may occur serially or separately.

In one embodiment, a node in the graph or network may be created and may be associated with, or represent, an entity, company, application, and/or a website. A temporary graph node may be created for each ambiguous or generic entity with which a first-level entity may share data. Additionally, a temporary graph node may be created for each of the data elements collected. For example, if the entity name is "Company.com" then a node is created for Company.com. Temporary graph nodes may be created for "Advertisers" and "Advertising Networks," as well as for other ambiguous or generic entity types described above. Edges may be created between Company.com and each temporary node for each of the data elements like name, e-mail, phone, etc.

For example, for implied nodes from shared identifiers/keys for which there may not be any company information, AI-ML may be used to collapse these temporary nodes to real companies if inferred similarities are found.

In step 125, ambiguous nodes (e.g., nodes that are not assigned to a specific entity) may be resolved into specific nodes as possible. In some embodiments, names for the ambiguous nodes may be found in data collection and usage policies. In other embodiments, other data sources may be reviewed for this information. Examples of other sources may include legal documents such as contracts, lawsuits, court transcripts, etc., news articles, press releases, other content on the entity's web sites, manual input, examination of web site code, etc.

In one embodiment, each ambiguous node may resolve into zero, one, or more entity names. In the case where no data are found the ambiguous node may be left ambiguous. In the case where one or more entity names are found, a node may be created for each discovered entity, and the edges that are connected to the ambiguous node may be replicated to the new entity node.

In one embodiment, in a pre-existing graph or network, the new entity node may already exist. Thus, the edges connected to the ambiguous node may be replicated to connect to the existing entity node. This process may be repeated for each new entity discovered and for each ambiguous node.

In step 130, the graph or network may be refined as necessary and/or desired. For example, as contracts or other data collection and usage policies are discovered or input into the system describing a relationship between two entities, or where original data collection and usage policies describe additional data restrictions placed on third parties, these may be reflected in rules associated with an edge to node connection. For example, if a privacy policy or other contract or textual data details that a data element (e.g., e-mail address) is shared with a third party but the third party is only permitted to use the e-mail address for specific purposes, this knowledge may be associated with the e-mail address sharing edge connection to the third-party entity node.

If no contractual or other textual data/information is discovered, then it is assumed that data may be legally permitted to propagate unrestricted through the graph or network.

In step 135, when a new entity node is added to the graph or network, the process recursively iterates for that new entity. For example, the privacy policy or other data collection and usage policies for the new entity is retrieved and parsed, new ambiguous nodes are created and resolved and new nodes that represent newly discovered entities are added to the graph.

In one embodiment, cycles may be prevented by never creating "back" links. For example, sharing agreements may be bi-directional. Further, a first-level entity may also be, e.g., a third-level party. In one embodiment, infinite loops may be prevented by eliminating the possibility of a cycle, by limiting the number of times a particular node is traversed, etc. For example, loop prevention may be used.

In another embodiment, cycles may be prevented using well-known cycle detection logic.

In yet another embodiment, cycles may be allowed in the data structure but prevented in processing and traversal.

In step 140, data probes may be inserted into an entity represented in the graph, and then the propagation of the data in the data probe may be monitored. For example, the graph or network may be validated or modified by inserting a data probe of synthetic data, or by monitoring real data, as it propagates through the graph or network. For example, the type of data, timing, etc. may be monitored. As the data propagates to different entities, the graph or network may be verified or modified, and edges may be removed or added as necessary. In addition, nodes may also be added as is necessary and/or desired.

In one embodiment, step 140 may be performed while the graph or network is being created, or whenever it is necessary and/or desired.

In one embodiment, a synthetic web browser (e.g., a virtual machine, etc.) may be used to browse to a website that is represented by a node in the graph. This browser may provide uniquely traceable data to a form on the website. Legal requests for data are created on behalf of the unique identifier to other nodes in the graph to determine which node entities have received it. These data requests may be reissued periodically to determine how long data takes to traverse the graph.

In step 145, artificial intelligence and/or machine learning may be used to create and/or modify the graph or network. For example, GML may be used as is necessary and/or desired. Instead of working on static data, these learning networks may work with dynamic changing information including significant changes in the graphs in each layer.

In step 150, AI-ML may be used to predict the flow of data in a network using discriminative models to predict the edge probabilities. Types of discriminative models may include: GNNs, bipartite graphs using scoring functions, recurrent neural networks (RNNs), and heuristics. AI-ML may be used to predict the flow of a consumer's data through the graph or network. For example, based on the data probes, the entities that may receive the consumer's data may be identified.

In step 155, actions may be taken using the graph or network. These actions may include creating insights and recommendations using AI-ML, and delivering those to the consumer so the consumer may make better decisions, request removal/deletion of personal or private data, etc.

For example, automated messages may be sent to entities that are likely to receive a consumer's data requesting the entities to delete the consumer's data. In one embodiment, nodes that are particularly active in sharing consumer data may be targeted initially, and then less active nodes may follow.

In one embodiment, a series of requests may be communicated as is necessary and/or desired.

In one embodiment, the requests may be sent preemptively, that is, before data may be shared with the entity.

In another embodiment, the graph or network may be used to identify a source of data. For example, given the name of a data broker or aggregator traverse the graph or network backwards to discover the list of suppliers.

In another embodiment, the graph or network may be used to identify any differences between what the user has agreed to in the privacy policy and what data is actually being taken by the entity, and what data is actually being shared with third parties. If the entity is taking or sharing data that is outside the permissions of the privacy policy (i.e., unauthorized), the user may be notified.

Figure 2:
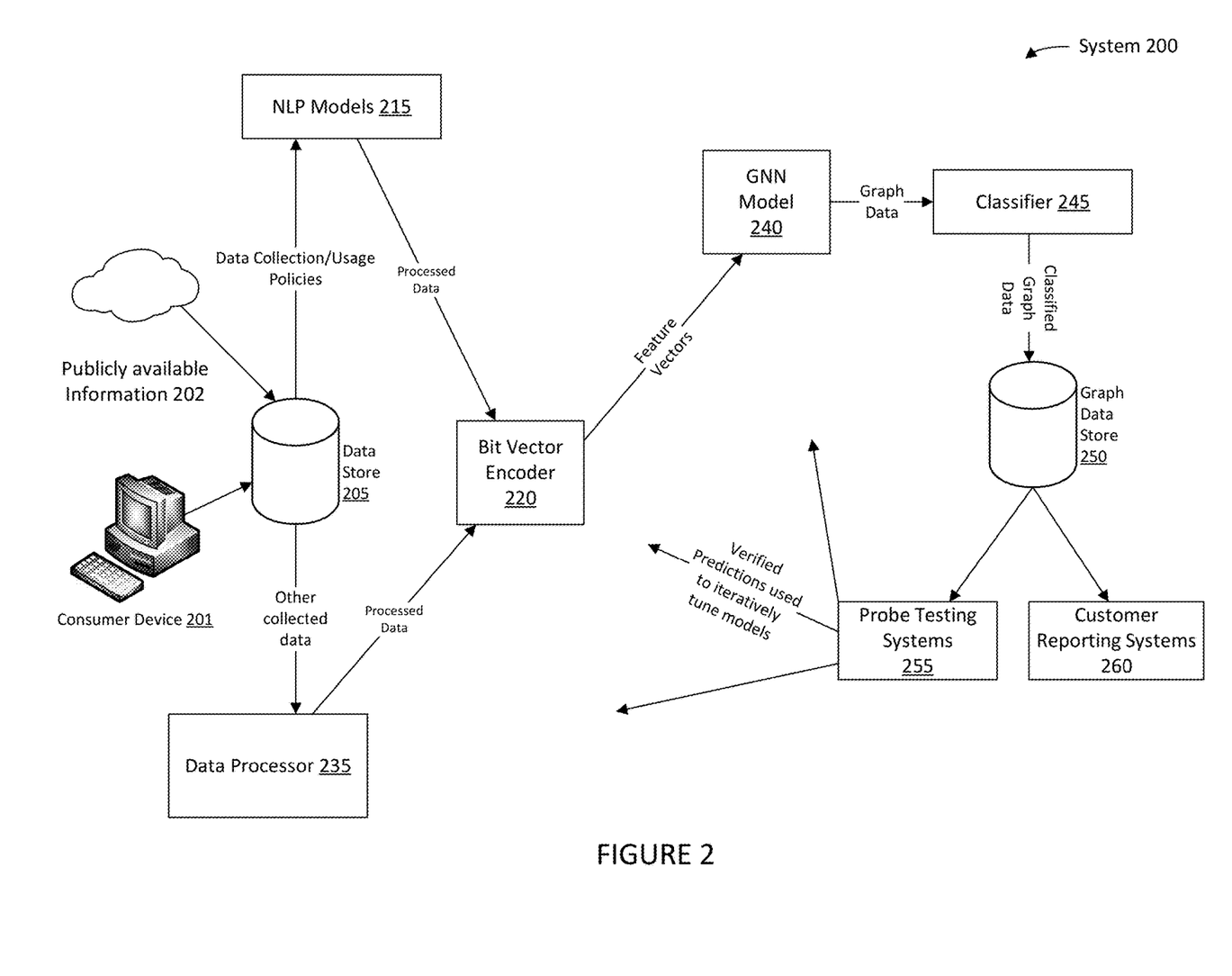
FIG. 2 is a block diagram of a system, in accordance with an embodiment.

FIG. 2 is a block diagram of an exemplary system for recursively identifying, traversing, and performing inference on data described by graphs.

In accordance with an embodiment, data, such as identified first-level entities and data collection and usage policies, is collected at data store 205. This data may be collected from consumer device 201 or from publicly available information 202 (e.g., textual data published or linked to public websites, such as privacy policies, contract, data collection and usage terms/policies, etc.). Data store 205 may be any suitable data store and may be a single data store or multiple data stores, as is necessary or desirable. In other embodiments, data collected from consumer device 201 and/or publicly available information 202 may be sent directly to modeling or transformative processes as described herein.

In accordance with an embodiment, data collected from consumer device 201 and/or publicly available information 202 may be sent for processing to NLP models 215 and/or data processor 235.

In an exemplary embodiment, textual data such as data collection and usage policies are sent to NLP models 215 for processing. NLP models 215 may process received textual data, such as collection and usage policies or other textual data and generate sharing/usage predictions. For example, NLP models 215 may process data collection and usage policies as described above with reference to step 115 of FIG. 1. NLP models 215 may then send processed, data structured data for storage before additional processing by system 200.

In accordance with an embodiment, other types of collected data, such as identified data-sharing nodes (e.g., identified first-level nodes), code collected/scraped from websites (e.g., HTML (Hyper Text Markup Language) or JavaScript code), analytical data about entities, and other types of data in various formats and structures are sent to data processor 235 for processing. Data processor 235 represents one or more data processing engines that prepare and/or transform various types, formats, structures, etc., of data for processing in a machine learning environment. Data processor 235 may include different algorithms and/or machine learning models to structure received data in logical groupings or assign traditional relationships to data, that may, e.g., prepare, structure, etc., received data for storage before further processing. In embodiments, data processor 235 may include data collection logic, data parsing logic, data organizing logic, etc.

For example, a website provided by an entity may implement a feature for logging in using a social media network's SDK (software development kit), allowing the website's users to more easily log/sign into the website. In such a scenario, the SDK of the social media network provider entity may collect data about the user's access environment. E.g., the SDK may collect information such as the user's time zone, city or region, a time the login event took place, details about the user's digital device (e.g., digital device 201), etc. Code collected/scraped from the website can be used to determine if the social media network SDK has been deployed by the website. Data processor 235 may organize, structure, etc., the scraped/collected data for further processing by system 200. For instance, use of the social network SDK may be associated with the entity as an attribute of the entity.

In accordance with an embodiment, system 200 may compare these findings with the privacy policy the entity has applied to/published at the website. In the case where the website is programmatically implemented to share such personal user data with third parties, but the published privacy policy indicates that the entity will not share such information, embodiments may determine this inconsistency and predict that a violation of the published privacy policy will occur. Additionally, embodiments may warn the user of the violation, as further described herein.

Processed data, either from NLP models 215, or from data processor 235, may be sent for processing by additional systems, data processing engines, and/or transformative or predictive models. In accordance with an embodiment, processed data from NLP models 215 and/or from data processor 235 may be sent to bit vector encoder 220. Bit vector encoder may include algorithms that provide bit vector encoding of input data. Techniques for bit vector encoding may include, e.g., TF/IDF (term frequency/inverse document frequency) or similar, or other, techniques.

For instance, bit vector encoder 220 may take data processed by NLP models 215 and or data processor 235 and translate each sequence into bit vectors that are feature vectors. In embodiments, this may be done, e.g., by calculating an occurrence frequency of each subsequence in an entire sequence of data. Bit (feature) vectors may be constructed from a tuple or a list of bits, or from an integer where the resulting stored bits correspond to the binary representation of the integer. A bit vector may be constructed from a disk file by first constructing an instance of a bit vector. In other embodiments, bit vectors may be constructed by reading bits directly from a file, or a file-like object.

In accordance with an embodiment, NLP models 215 may organize textual data for bit-vectoring using techniques including Binary Term Frequency, Bag of Words Frequency (BOW), Normalized Term Frequency (L1), Normalized TF-IDF (L2) (TF-IDF stands for Term Frequency-Inverse Document Frequency), Word2Vec, etc.

In accordance with embodiments, data processor 235 may group/organize/structure received data by website content, gathering source (the entity where the data comes from), etc.

Bit-vectorized feature vectors created from a combination of processing at NLP models 215, data processor 235, and bit vector encoder 220 may be generated. In an embodiment, data or feature vectors originating from both NLP models 215 or data processor 235 are related to, or associated with each other. For example, first-level entity data processed at data processor 235 may be associated with data collection and usage policies processed at NLP models 215. Associations may occur before or after feature vectors are produced by, e.g., bit vector encoder 220. E.g., feature vectors may include features previously processed by both NLP models 215 and data processor 235.

Processed data from bit vector encoder 220 may then be stored as bit-vector encoded data before being sent for additional processing. For example, data processed by bit vector encoder 220 may be stored/processed as feature vectors.

In accordance with an embodiment, bit encoded data may then be processed by system 200 as input data to a graph neural network. GNN (Graph neural network) 240 may be any suitable or desirable machine learning model, such as those examples listed above. In accordance with embodiments, GNN 240 may be a GCN (graph convolutional network) model, a GLN (graph learning network), etc. GNN 240 may process bit encoded feature vectors representing topological associations into topological graphs. For example, GNN 240 may process provided feature vectors and output representational vectors, node level results, graph level results, edge level results, node pooling information, etc.

In an exemplary embodiment, GNN 240 may receive vectorized features associated with data collected from publicly available information 202 and/or consumer device 201. For example, feature vectors may include node data and node-related data such as privacy policies, data usage and sharing policies, known data sharing relationships, etc. GNN 240 may organize this vectorized information/data into a graph structure.

Graph data from GNN 240 may then be processed by classifier 245. Classifier 245 may train and predict sharing network nodes and edges of the graph data it processes. Classifier 245 may be a machine learning engine and may include one or more classification ML models/algorithms, such as a decision tree, a naive bayes algorithm, or any other desirable or necessary classifying model/algorithm. In accordance with an embodiment, classifier 245 may assign labels to nodes and node attribute data, and may predict edges based on nodes and node attributes. For instance, classifier 245 may assign a "social network provider" label to a graph node, may assign an attribute of the node a "data collection" label or a "privacy policy" label, etc. Additionally, based on assigned node and attribute labels, classifier 245 may predict edges, or relationships, between classified nodes. For example, classifier 245 may predict/assign an edge relationship between a node labeled as an online advertiser and a node labeled as a social network provider, where the edge represents a type of data that the social network provider will share with the online advertiser.

In accordance with an embodiment, the classified graph data output by classifier 245 may then be stored in graph data store 250. Graph data store 250 may store the graph data for use. For example, probe testing systems 255 and customer reporting systems 260 may use the classified graph data stored in graph data store 250.

Customer reporting systems 260 may generate data/reports for users/customers indicating entities that that collect/share the users' personal information and with what other entities it may be sharing the users' personal information based on the stored classified graph data (as described in further detail herein with reference to step 155 of FIG. 1).

Probe testing systems 255 may use the stored classified graph data to verify the graph data and predictions generated by system 200, as discussed in detail above. Data and predictions verified or falsified by probe testing systems 255 may, in turn, be used to iteratively tune the models/algorithms of NLP models 215, data processor 235, bit vector encoder 220, GNN 240, classifier 245, and graph data store 250, as discussed herein. Model/algorithm tuning of these components of system 200 may include adjusting a number of layers of neural network models, adjusting the function of a layer within a neural network model, changing the type of information layers pass to each other within a neural network model, changing the type of neural network model, applying different weighting to a model, fitting a different model to particular data, etc.

Although multiple embodiments have been disclosed, it should be recognized that these embodiments are not mutually exclusive and features from one embodiment may be used with others.

Hereinafter, general aspects of implementation of the systems and methods of the invention will be described.

The system of the invention or portions of the system of the invention may be in the form of a "processing machine," such as a general-purpose computer, for example. As used herein, the term "processing machine" is to be understood to include at least one processor that uses at least one memory. The at least one memory stores a set of instructions. The instructions may be either permanently or temporarily stored in the memory or memories of the processing machine. The processor executes the instructions that are stored in the memory or memories in order to process data. The set of instructions may include various instructions that perform a particular task or tasks, such as those tasks described above. Such a set of instructions for performing a particular task may be characterized as a program, software program, or simply software.

In one embodiment, the processing machine may be a specialized processor.

As noted above, the processing machine executes the instructions that are stored in the memory or memories to process data. This processing of data may be in response to commands by a user or users of the processing machine, in response to previous processing, in response to a request by another processing machine and/or any other input, for example.

As noted above, the processing machine used to implement the invention may be a general-purpose computer. However, the processing machine described above may also utilize any of a wide variety of other technologies including a special purpose computer, a computer system including, for example, a microcomputer, mini-computer or mainframe, a programmed microprocessor, a micro-controller, a peripheral integrated circuit element, a CSIC (Customer Specific Integrated Circuit) or ASIC (Application Specific Integrated Circuit) or other integrated circuit, a logic circuit, a digital signal processor, a programmable logic device such as an FPGA, PLD, PLA or PAL, or any other device or arrangement of devices that are capable of implementing the steps of the processes of the invention.

The processing machine used to implement the invention may utilize a suitable operating system. Thus, embodiments of the invention may include a processing machine running the iOS operating system, the OS X operating system, the Android operating system, the Microsoft Windows™ operating systems, the Unix operating system, the Linux operating system, the Xenix operating system, the IBM AIX™ operating system, the Hewlett-Packard UX™ operating system, the Novell Netware™ operating system, the Sun Microsystems Solaris™ operating system, the OS/2™ operating system, the BeOS™ operating system, the Macintosh operating system, the Apache operating system, an OpenStep™ operating system or another operating system or platform.

It is appreciated that in order to practice the method of the invention as described above, it is not necessary that the processors and/or the memories of the processing machine be physically located in the same geographical place. That is, each of the processors and the memories used by the processing machine may be located in geographically distinct locations and connected so as to communicate in any suitable manner. Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two pieces of equipment in two different physical locations. The two distinct pieces of equipment may be connected in any suitable manner. Additionally, the memory may include two or more portions of memory in two or more physical locations.

To explain further, processing, as described above, is performed by various components and various memories. However, it is appreciated that the processing performed by two distinct components as described above may, in accordance with a further embodiment of the invention, be performed by a single component. Further, the processing performed by one distinct component as described above may be performed by two distinct components. In a similar manner, the memory storage performed by two distinct memory portions as described above may, in accordance with a further embodiment of the invention, be performed by a single memory portion. Further, the memory storage performed by one distinct memory portion as described above may be performed by two memory portions.

Further, various technologies may be used to provide communication between the various processors and/or memories, as well as to allow the processors and/or the memories of the invention to communicate with any other entity, i.e., so as to obtain further instructions or to access and use remote memory stores, for example. Such technologies used to provide such communication might include a network, the Internet, Intranet, Extranet, LAN, an Ethernet, wireless communication via cell tower or satellite, or any client server system that provides communication, for example. Such communications technologies may use any suitable protocol such as TCP/IP, UDP, or OSI, for example.

As described above, a set of instructions may be used in the processing of the invention. The set of instructions may be in the form of a program or software. The software may be in the form of system software or application software, for example. The software might also be in the form of a collection of separate programs, a program module within a larger program, or a portion of a program module, for example. The software used might also include modular programming in the form of object oriented programming. The software tells the processing machine what to do with the data being processed.

Further, it is appreciated that the instructions or set of instructions used in the implementation and operation of the invention may be in a suitable form such that the processing machine may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler, or interpreter. The machine language is binary coded machine instructions that are specific to a particular type of processing machine, i.e., to a particular type of computer, for example. The computer understands the machine language.

Any suitable programming language may be used in accordance with the various embodiments of the invention. Illustratively, the programming language used may include assembly language, Ada, APL, Basic, C, C++, dBase, Forth, Html, Java, Modula-2, Pascal, Prolog, Python, REXX, Visual Basic, and/or JavaScript, for example. Further, it is not necessary that a single type of instruction or single programming language be utilized in conjunction with the operation of the system and method of the invention. Rather, any number of different programming languages may be utilized as is necessary and/or desirable.

Also, the instructions and/or data used in the practice of the invention may utilize any compression or encryption technique or algorithm, as may be desired. An encryption module might be used to encrypt data. Further, files or other data may be decrypted using a suitable decryption module, for example.

As described above, the invention may illustratively be embodied in the form of a processing machine, including a computer or computer system, for example, that includes at least one memory. It is to be appreciated that the set of instructions, i.e., the software for example, that enables the computer operating system to perform the operations described above may be contained on any of a wide variety of media or medium, as desired. Further, the data that is processed by the set of instructions might also be contained on any of a wide variety of media or medium. That is, the particular medium, i.e., the memory in the processing machine, utilized to hold the set of instructions and/or the data used in the invention may take on any of a variety of physical forms or transmissions, for example. Illustratively, the medium may be in the form of paper, paper transparencies, a compact disk, a DVD, an integrated circuit, a hard disk, a floppy disk, an optical disk, a magnetic tape, a RAM, a ROM, a PROM, an EPROM, a wire, a cable, a fiber, a communications channel, a satellite transmission, a memory card, a SIM card, or other remote transmission, as well as any other medium or source of data that may be read by the processors of the invention.

Further, the memory or memories used in the processing machine that implements the invention may be in any of a wide variety of forms to allow the memory to hold instructions, data, or other information, as is desired. Thus, the memory might be in the form of a database to hold data. The database might use any desired arrangement of files such as a flat file arrangement or a relational database arrangement, for example.

In the system and method of the invention, a variety of "user interfaces" may be utilized to allow a user to interface with the processing machine or machines that are used to implement the invention. As used herein, a user interface includes any hardware, software, or combination of hardware and software used by the processing machine that allows a user to interact with the processing machine. A user interface may be in the form of a dialogue screen for example. A user interface may also include any of a mouse, touch screen, keyboard, keypad, voice reader, voice recognizer, dialogue screen, menu box, list, checkbox, toggle switch, a pushbutton or any other device that allows a user to receive information regarding the operation of the processing machine as it processes a set of instructions and/or provides the processing machine with information. Accordingly, the user interface is any device that provides communication between a user and a processing machine. The information provided by the user to the processing machine through the user interface may be in the form of a command, a selection of data, or some other input, for example.

As discussed above, a user interface is utilized by the processing machine that performs a set of instructions such that the processing machine processes data for a user. The user interface is typically used by the processing machine for interacting with a user either to convey information or receive information from the user. However, it should be appreciated that in accordance with some embodiments of the system and method of the invention, it is not necessary that a human user actually interact with a user interface used by the processing machine of the invention. Rather, it is also contemplated that the user interface of the invention might interact, i.e., convey and receive information, with another processing machine, rather than a human user. Accordingly, the other processing machine might be characterized as a user. Further, it is contemplated that a user interface utilized in the system and method of the invention may interact partially with another processing machine or processing machines, while also interacting partially with a human user.

It will be readily understood by those persons skilled in the art that the present invention is susceptible to broad utility and application. Many embodiments and adaptations of the present invention other than those herein described, as well as many variations, modifications, and equivalent arrangements, will be apparent from or reasonably suggested by the present invention and foregoing description thereof, without departing from the substance or scope of the invention.

Accordingly, while the present invention has been described here in detail in relation to its exemplary embodiments, it is to be understood that this disclosure is only illustrative and exemplary of the present invention and is made to provide an enabling disclosure of the invention. Accordingly, the foregoing disclosure is not intended to be construed or to limit the present invention or otherwise to exclude any other such embodiments, adaptations, variations, modifications, or equivalent arrangements.

The invention claimed is:

1. A computer implemented method comprising:
retrieving data collection and usage policies for consumer data of an entity;
processing the data collection and usage policies with a natural language processing model;
generating, by the natural language processing model, predictive data collection and data usage attributes;
generating a feature vector from the predictive data collection and data usage attributes based on an occurrence frequency of each subsequence of data within the predictive data collection and data usage attributes;
processing the feature vector with a graph neural network;
storing, as output of the graph neural network, data structured as a graph including the entity and the predictive data collection and data usage attributes; and
processing the data structured as a graph with a classifier model, wherein the classifier model labels the entity as a first node in the data structured as a graph and predicts an edge to a second node in the data structured as a graph based on the predictive data collection and data usage attributes.

2. The method of claim 1, wherein the graph neural network is a graph convolutional network (GCN).

3. The method of claim 1, further comprising:
verifying the predictive data collection and data usage attributes using trackable data.

4. The method of claim 3, further comprising:
iteratively tuning one of the natural language processing model, the graph neural network, and the classifier model with the verified predictive data collection and data usage attributes.

5. The method of claim 1, further comprising:
presenting, to a consumer of online services offered by the entity, information related to the predictive data collection and data usage attributes.

6. The method of claim 5, wherein the information related to the predictive data collection and data usage attributes includes an indication that the entity shares personal data of the consumer with another entity.

7. The method of claim 6, wherein the indication that the entity shares personal data of the consumer with another entity is based on the predicted edge to a second node in the data structured as a graph.

8. The method of claim 4, further comprising:
tuning the graph neural network including adjusting a number of layers of the graph neural network.

9. The method of claim 4, further comprising:
tuning the classifier model including fitting a different model to the data structured as a graph.

10. The method of claim 1, further comprising:
resolving ambiguous nodes in the data structured as a graph.

11. The method of claim 1, further comprising:
generating a feature vector from data representing the entity;
associating the feature vector generated from the predictive data collection and data usage attributes with the feature vector from the data representing the entity; and
processing the associated feature vectors with the graph neural network.

12. A non-transitory computer readable storage medium, including instructions stored thereon, which when read and executed by one or more computer processors, cause the one or more computer processors to perform steps comprising:
retrieving data collection and usage policies for consumer data of an entity;
processing the data collection and usage policies with a natural language processing model;
generating, by the natural language processing model, predictive data collection and data usage attributes;

generating, a feature vector from the predictive data collection and data usage attributes based on an occurrence frequency of each subsequence of data within the predictive data collection and data usage attributes;

processing the feature vector with a graph neural network;

storing, as output of the graph neural network, data structured as a graph including the entity and the predictive data collection and data usage attributes; and processing the data structured as a graph with a classifier model, wherein the classifier model labels the entity as a first node in the data structured as a graph and predicts an edge to a second node in the data structured as a graph based on the predictive data collection and data usage attributes.

13. The non-transitory computer readable storage medium of claim 12, wherein the graph neural network is a graph convolutional model.

14. The non-transitory computer readable storage medium of claim 12, further including instructions stored thereon, which when read and executed by one or more computer processors, cause the one or more computer processors to perform steps comprising:

verifying the predictive data collection and data usage attributes using trackable data.

15. The non-transitory computer readable storage medium of claim 14, further including instructions stored thereon, which when read and executed by one or more computer processors, cause the one or more computer processors to perform steps comprising:

tuning one of the natural language processing model, the graph neural network, and the classifier model with the verified predictive data collection and data usage attributes.

16. The non-transitory computer readable storage medium of claim 12, further including instructions stored thereon, which when read and executed by one or more computer processors, cause the one or more computer processors to perform steps comprising:

presenting, to a consumer of online services offered by the entity, information related to the predictive data collection and data usage attributes.

17. The non-transitory computer readable storage medium of claim 16, wherein the information related to the predictive data collection and data usage attributes includes an indication that the entity shares personal data of the consumer with another entity.

18. The non-transitory computer readable storage medium of claim 17, wherein the indication that the entity shares personal data of the consumer with another entity is based on the predicted edge to a second node in the data structured as a graph.

19. The non-transitory computer readable storage medium of claim 15, further including instructions stored thereon, which when read and executed by one or more computer processors, cause the one or more computer processors to perform steps comprising:

tuning the graph neural network including adjusting a number of layers of the graph neural network.

20. The non-transitory computer readable storage medium of claim 12, further including instructions stored thereon, which when read and executed by one or more computer processors, cause the one or more computer processors to perform steps comprising:

generating a feature vector from data representing the entity;

associating the feature vector generated from the predictive data collection and data usage attributes with the feature vector from the data representing the entity; and processing the associated feature vectors with the graph neural network.

* * * * *